(12) United States Patent
Richard

(10) Patent No.: US 6,261,332 B1
(45) Date of Patent: Jul. 17, 2001

(54) FILTRATION SYSTEM FOR A BED

(75) Inventor: Bernard J. Richard, 11 Durfee Rd., Dudley, MA (US) 01571

(73) Assignee: Bernard J. Richard, Dudley, MA (US)

( * ) Notice: Subject to any disclaimer, the term of this patent is extended or adjusted under 35 U.S.C. 154(b) by 0 days.

(21) Appl. No.: 09/414,692

(22) Filed: Oct. 7, 1999

Related U.S. Application Data

(60) Provisional application No. 60/104,057, filed on Oct. 13, 1998.

(51) Int. Cl.[7] .............................. B01D 29/56; B01D 35/30
(52) U.S. Cl. .............................. 55/385.1; 55/471; 55/473; 55/486; 55/489
(58) Field of Search .............................. 55/385.1, 385.2, 55/486, 489, 471, 473, 467; 128/205.26

(56) References Cited

U.S. PATENT DOCUMENTS

| | | | |
|---|---|---|---|
| 3,724,172 | * | 4/1973 | Wood .............................. 55/385.1 |
| 3,838,556 | * | 10/1974 | Finger .............................. 55/385.1 |
| 3,908,655 | * | 9/1975 | Lund .............................. 128/205.26 |
| 5,129,928 | * | 7/1992 | Chan et al. .............................. 55/385.1 |
| 5,389,037 | * | 2/1995 | Hale .............................. 55/467 |
| 5,832,919 | * | 11/1998 | Kano et al. .............................. 128/205.26 |

* cited by examiner

*Primary Examiner*—David A. Simmons
*Assistant Examiner*—Robert A. Hopkins
(74) *Attorney, Agent, or Firm*—Brian M. Dingman

(57) ABSTRACT

An air filtration system which is adapted to filter contaminants and is intended for use with a bed having a head area, comprising, one or more air intake ports adapted to be located under the bed; one or more fans adapted to be located under the bed and downstream of the intake port; a first air filter downstream of the intake port; and one or more conduits, downstream of the air intake port, at least one of which is capable of transporting air filtered by the first filter towards one or more air outlet ports located proximate the head area.

14 Claims, 2 Drawing Sheets

FILTRATION SYSTEM FOR A BED

This application is a continuation of provisional patent application 60/104,057 filed Oct. 13, 1998.

FIELD OF THE INVENTION

This invention relates to air filtration devices and more specifically to an air filtration system adapted for use with a bed.

BACKGROUND OF THE INVENTION

Current air filtration devices for use in the home generally are stand alone units having a single enclosure containing one or more filters through which air is drawn and from which the filtered air exits radially at high speeds. These devices are rated, based on the amount and rate at which air is filtered, as cubic feet per minute (CFM). Using a standard size room as a basis, a rating for an air filter is usually given as "room air changes per hour" which is derived from the CFM ratio. However, despite the suggestion that all the air in a room is cleaned several times per hour, only the air exiting from the device is truly clean. For illustration, unfiltered air, being drawn towards the air intake port, is continuously contaminating the filtered air exiting from the same device. Therefore, even if one of these currently available filtration devices is placed in a bedroom, a person sleeping in a bed in the room is not actually breathing clean, filtered air, but rather is breathing air that is only somewhat cleaner than air that is wholly unfiltered.

Moreover, current filtration devices are highly inefficient because, as single, stand alone units, at least some of the filtered air exiting radially from these devices is being drawn directly back into the intake ports. Location of the device then becomes an important factor with current devices. Rather than cleaning all the air in a given room, these devices tend to inefficiently refilter the same air in a portion of the room over and over again. Although these devices can be placed alongside or at the foot of a bed, they do not deliver truly clean air to someone lying in the bed. Unless a room is air tight, which virtually all rooms are not, air borne contaminants are constantly being replenished by outside, unfiltered air.

Furthermore, the ability of these devices to clean more air at a faster rate is dependent on the power and speed of the fans employed in the devices. Thus the noise level of these fans, especially with the larger units, renders these devices unsuitable for use while a person is sleeping. In addition, dust mites and other allergens associated with mattresses, pillows and bed linens may not be filtered at all by current filtration devices.

SUMMARY OF THE INVENTION

It is therefore a primary object of this invention to provide an air filtration device which delivers filtered air directly to the head area of a person lying down in a bed.

It is a further object of this invention to provide an air filtration device adapted for use with a bed that is more efficient than previous air filtration systems.

It is a further object of this invention to provide an air filtration device capable of drawing and filtering dust mites and other allergens from the mattress, box spring, pillows and/or bed linens.

It is a further object of this invention to provide an air filtration device that requires less horsepower than previous devices, thus a device that is quieter and more suited to use while a person is sleeping.

It is a further object of this invention to provide an air filtration device capable of delivering filtered air directly to a person sleeping in a bed immediately after the device is actuated.

The filtration system of the invention is the result of efforts to design an efficient air filter which specifically directs clean, filtered air to the head area of a person sleeping in bed. The invention is intended for use with all types of standard beds. The invention is intended to provide relief to a person who suffer from air borne allergens while the person sleeps. The device is designed to fill the gap between the mattress/box spring and the headboard. The device is held in place by a tab which is pinched between the mattress and the box spring. The invention may also be used in connection with a mattress which sits on a bedboard rather than on a box spring.

The invention is designed to provide quiet, efficient relief by locating the intake port, fan and motor underneath the bed in a sound deadening enclosure. Filtered air is pushed at a plenum located between the bed and the headboard. The filter air effectively envelopes a person lying in the bed with clean air. Since the intake port is located under the bed and the filtered air exits away from the intake port and is directed at a sleeping person's head, the design is substantially more efficient than previous designs. The design is more efficient because the filtered air is not drawn immediately back into the intake port as it exits, less filtered air is needed because the air is directed at the user's head and less horsepower is needed to drive the fan because less air is needed.

In addition, there is no recovery period and relief begins immediately. There is also no need to clean all the air in the room prior to sleep, there is no need to maintain scrupulously clean carpets, drapes or bed linens, and doors and windows may be left open.

A preferred embodiment of the air filtration system of the invention which is adapted to filter contaminants and is intended for use with a bed having a head area, comprises: one or more air intake ports adapted to be located under the bed; one or more fans adapted to be located under the bed and downstream of the intake port; a first air filter downstream of the intake port; and one or more conduits, downstream of the air intake port, at least one of which is capable of transporting ail filtered by the first filter towards one or more air outlet ports located proximate the head area. The system may further comprise a second filter downstream of the first filter, wherein at least one of the conduits is preferably located between the first filter and the second filter, wherein the first filter is capable of filtering at least gross contaminants and wherein the second filter is a low pore size filter. At least one of the conduits is preferably a plenum located between the first filter and the second filter.

If the bed with which the system is used includes at least one mattress which sits on a box spring or a bedboard, the system may further comprise: an upper housing in which at least one of the outlet ports is disposed; and a support means, to maintain the upper housing proximate the head area of the bed, of which at least a portion of the support means is capable of being inserted and held between the mattress and the box spring or the bedboard. The system may also comprise a lower housing in which at least one of the intake ports, at least one of the fans, and the first filter are disposed, wherein at least one of the conduits transports air from the lower housing to the upper housing. Similar a second filter may be used having a low pore size, such as a HEPA filter, and disposed in the upper housing. At least one of the conduits is preferably a plenum located between the first filter and the second filter. The bed may also include a headboard, in which case, the upper housing may be adapted to be maintained between the mattress and the headboard.

Another preferred embodiment of the air filtration system of the invention which is adapted to filter contaminants and is intended for use with a bed having a head area, comprises: one or more air intake ports adapted to be located under the bed; one or more prefilters downstream of the intake ports for removing at least gross contaminants; one or more fans downstream of the prefilter and adapted to be located under the bed; one or more low pore size filters downstream of the prefilter; and one or more plenums, located between the prefilter and the low pore size filter, capable of transporting air from the prefilter to the filter and adapted to direct filtered air to the head area. Similar to the first described preferred embodiment, the system may be used with a bed which includes it least one mattress which sits on a box spring or a bedboard. With such a bed, the system preferably further comprises an upper housing in which at least one of the outlet ports is disposed; and a support means, to maintain the upper housing proximate the head area of the bed, of which at least a portion of the support means is capable of being inserted and held between the mattress and the box spring or the bedboard; and may also include a lower housing in which at least one of the intake ports, at least one of the fans, and the prefilter are disposed, wherein at least one of the plenums transports air from the lower housing to the upper housing. The low pore size filter is preferably disposed in the upper housing and if the bed includes a headboard, the upper housing is preferably maintained between the mattress and the headboard.

BRIEF DESCRIPTION OF THE DRAWINGS

Other objects, features and advantages will occur to those skilled in the art from the following description of the preferred embodiments and the accompanying drawings in which.

DETAILED DESCRIPTION OF THE PREFERRED EMBODIMENTS

The air filtration system of the invention is adapted to filter any number and types of contaminants from the air surrounding a bed and from the bed components. The system, which is generally intended for use with a bed having a head area, is characterized by a first unit, adapted to sit beneath the bed, which houses one or more air intake ports; one or more prefilters downstream of the intake ports for removing at least gross contaminants; and one or more fans downstream of the prefilter; and a second unit, adapted to be supported between the headboard or wall and the mattress, which houses one or more low pore size filters downstream of the prefilter, and one or more air outlet ports which direct filtered air directly to the head area of the bed; and one or more plenums, for transporting partially filtered air from the first unit beneath the bed and the second unit supported between the mattress and the headboard. The system also preferably includes a support means, to maintain the upper housing proximate the head area of the bed, of which at least a portion of the support means is capable of being inserted and held between the mattress and the box spring or bedboard.

Figure 1:
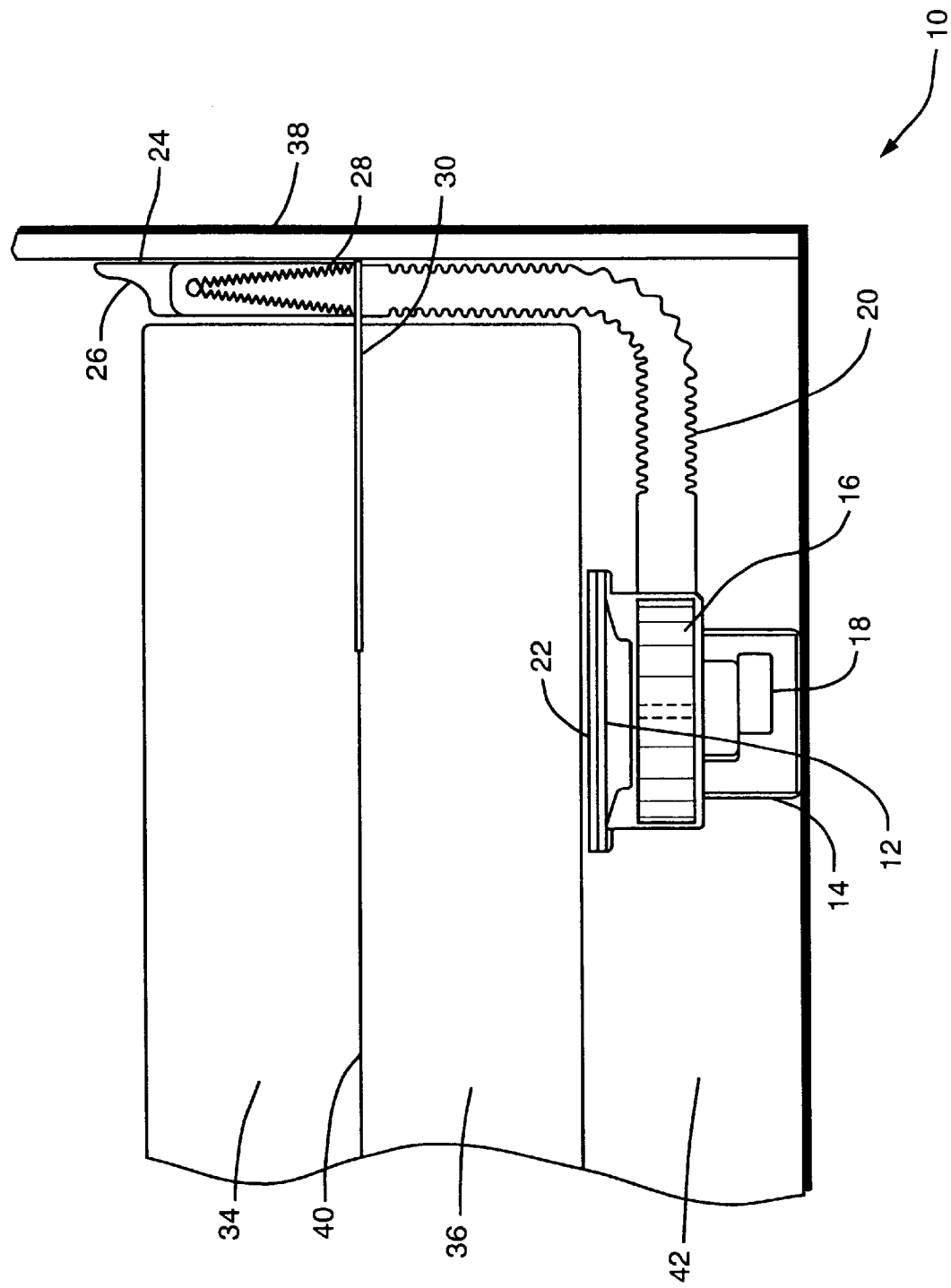
FIG. 1 is a cross-sectional view of the air filtration system of the invention in use with a bed.
Figure 2:
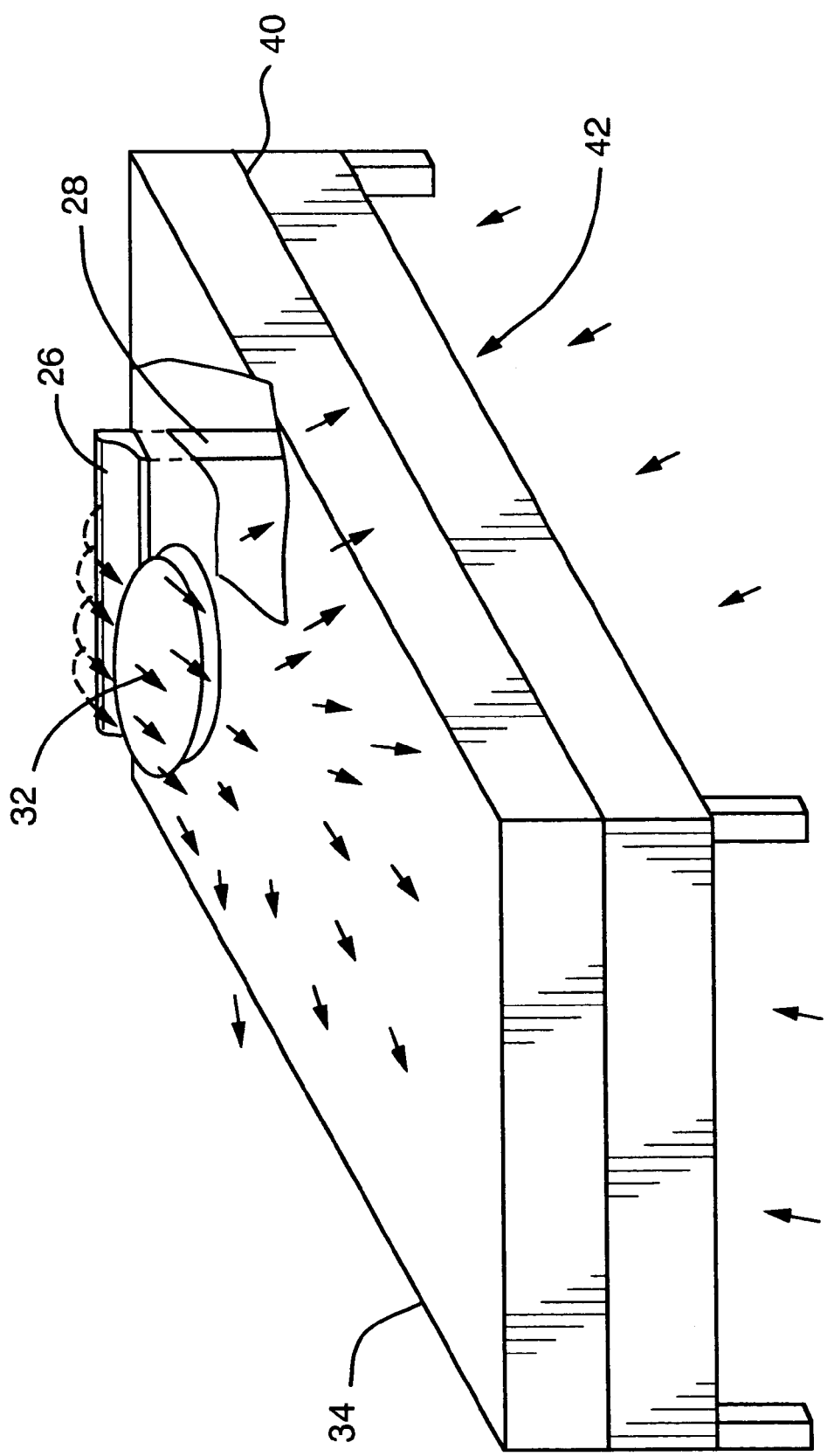
FIG. 2 is a perspective, partial cut-out view of the air filtration system of FIG. 1.

FIGS. 1 and 2 show the preferred embodiment of the filtration system of the invention, generally referred to as system 10. System 10 is generally intended for use with a bed having mattress 34, box spring/bedboard 36, intermediate space 40 and headboard 38, having a commonly understood head area 32 located at the head of the bed where a person is most likely to lie their head when sleeping. System 10 includes a first or lower housing 14 which should be sized to fit under the bed; a second or upper housing 24 adapted to fit into the gap between mattress 34 and headboard 38; plenum 20 which extends between housing 14 and housing 24; and support tab 30. Housing 14 houses air intake ports 22, prefilter 12, fan 16 and motor 18. Housing 24 houses air outlet ports 26 and low pore size filter 28 (preferably a HEPA filter). Air from lower housing 14 is forced up and through HEPA filter 28 and out outlet ports 26 towards lead alga 32 by pressure in the plenum created by fan 16 which draws air through intake ports 22 into prefilter 12 and pushes the partially filtered air out of housing 12 into plenum 20. Fan 16 is driven by a low powered motor 18. Upper housing 24 is seated on an outer portion of support tab 30. Support tab 30 may either be fixed to upper housing 24 or a separate component having an opening through the support tab through which plenum 20 may be passed. An inner portion of support tab 30 is adapted to slide into intermediate space 40 between mattress 34 and box spring 36. The length of the inner portion of support tab 30 should be such that the weight of the mattress will hold the outer portion on which the upper housing is seated in an upright position. If upper housing 28 is place in a gap between a headboard or wall, the headboard or wall will help to support upper housing 28 in an upright position so that air outlet ports 26 are positioned to direct filtered air to head area 32.

Generally, air filtration is achieved more efficiently by the invention because air is pulled from underneath the bed, generally in the direction of arrow 42, through prefilter 12 which is located close to the underside of the bed to minimize stray dust collection and to draw mites and other allergens out of the bed and bed linens. This prefilter can be a simple filter or tailored to a specific need, for example, a carbon-loaded filter media to absorb gaseous contaminants. Easy access to the prefilter enables a use to replace the prefilter to extend the life of the low pore size HEPA filter. As noted, air is directed through the system by low speed cenitrifugal fan 16. This results in a large volume low speed supply of air via a quiet and unobtrusive filtering system. Fan 16 also serves to pressurize plenum 20 to force the air through HEPA filter 28. The plenum is sealed airtight to prevent filtered air from escaping. The plenum is also provided with a means for opening at least the upper end of plenum 20 to change the HEPA filter.

The order of the system components is not necessarily critical. For example, the fan may be upstream or downstream of the filter/s. If upstream, the air will be pushed through the filters, if downstream, the air will be drawn through the filters. In addition, a variety of fans and filter media may be used depending on the materials to be filtered and the filtration speed desired. What is critical to the system is that the filtered air be directed at the head area of the bed where a person's head is most likely to be located when lying on the bed.

Controls may also be provided including, but not limited to, a three position switch: "on", "off" and "light activated" for automatic nighttime operation.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. An air filtration system, adapted to filter contaminants, for use with a bed having a head area, wherein said bed includes at least one mattress which sits on a box spring or a bedboard, comprising, one or more air intake ports adapted to be located under said bed;

one or more fans adapted to be located under said bed and downstream of said intake port;

a first air filter downstream of said intake port;

one or more conduits, downstream of said air intake port, at least one of which is capable of transporting air filtered by said first filter towards one or more air outlet ports located proximate said head area; and an upper housing in which at least one of said outlet ports is disposed; and a support means, to maintain said upper housing proximate said head area of said bed, of which at least a portion of said support means is capable of being inserted and held between said mattress and said box-spring or said bedboard.

2. The filtration system of claim 1, further comprising a second filter downstream of said first filter.

3. The filtration system of claim 2, wherein at least one of said conduits is located between said first filter and said second filter, wherein said first filter is capable of filtering at least gross contaminants and wherein said second filter is a low pore size filter.

4. The filtration system of claim 2, wherein at least one of said conduits is a plenum located between said first filter and said second filter.

5. The filtration system of claim 1, further comprising, a lower housing in which at least one of said intake ports, at least one of said fans, and said first filters are disposed, wherein at least one of said conduits transport air from said lower housing to said upper housing.

6. The filtration system of claim 1, further comprising a second filter having a low pore size and disposed in said upper housing.

7. The filtration system of claim 6, wherein said second filter is a HEPA filter.

8. The filtration system of claim 6, wherein at least one of said conduits is a plenum located between said first filter and said second filter.

9. The filtration system of claim 1, wherein said bed further includes a headboard, wherein said upper housing is adapted to be maintained between said mattress and said headboard.

10. An air filtration system, adapted to filter contaminants, for use with a bed having a head area, wherein said bed includes at least one mattress which sits on a boxspring or a bedboard, comprising, one or more air intake ports adapted to be located under said bed;

one or more prefilters downstream of said intake ports for removing at least gross contaminants;

one or more fans downstream of said prefilter and adapted to be located under said bed;

one or more low pore size filters downstream of said prefilter; and one or more plenums, located between said prefilter and said low pore size filter, capable of transporting air from said prefilter to said low pore size filter;

one or more air outlet ports located downstream of said low pore size filter and adapted to direct filtered air to said head area; and an upper housing in which at least one of said outlet ports is disposed; and a support means, to maintain said upper housing proximate said head area of said bed, of which at least a portion of said support means is capable of being inserted and held between said mattress and said box-spring or said bedboard.

11. The filtration system of claim 10, further comprising, a lower housing in which at least one of said intake ports, at least one of said fans, and said prefilter are disposed, wherein at least one of said plenums transports air from said lower housing to said upper housing.

12. The filtration system of claim 10, wherein said low pore size filter is disposed in said upper housing.

13. The filtration system of claim 12, wherein said low pore size filter is a HEPA filter.

14. The filtration system of claim 12, wherein said bed further includes a headboard, wherein said upper housing is adapted to be maintained between said mattress and said headboard.

* * * * *